Aug. 6, 1957   A. W. BATEMAN   2,801,949
PROCESS OF MAKING PATENT LEATHER-LIKE FINISH
ON POLYVINYL CHLORIDE SHEET MATERIALS
Filed Nov. 6, 1953   2 Sheets-Sheet 1
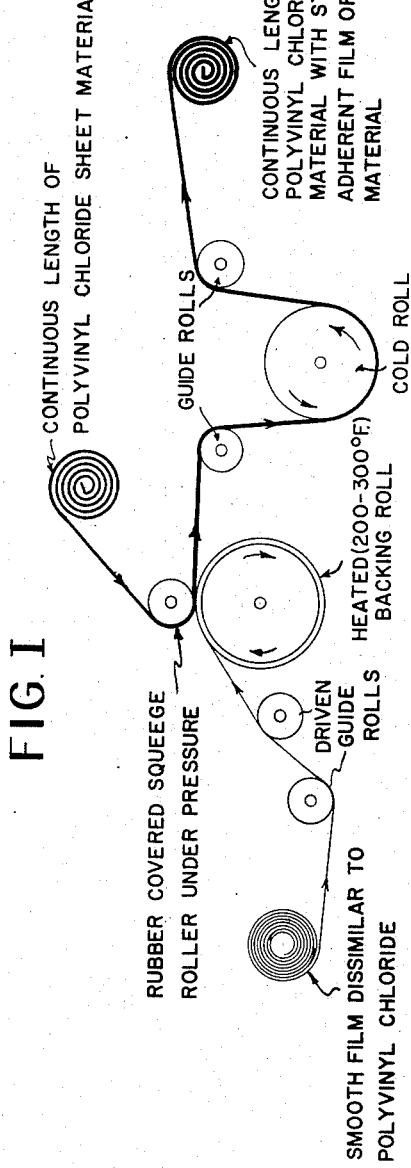
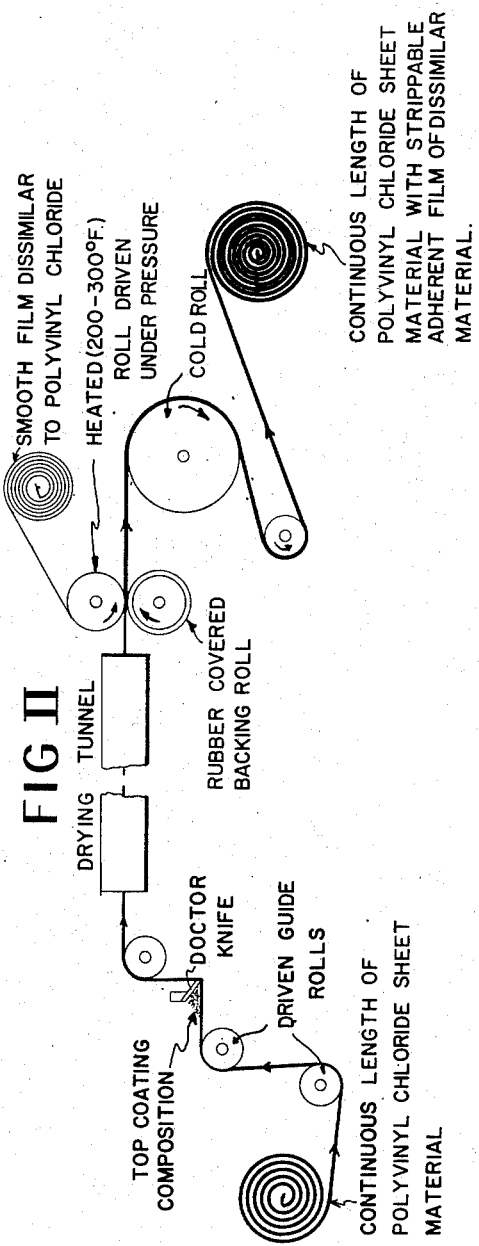
INVENTOR
ALVA WAYNE BATEMAN
BY
AGENT Aug. 6, 1957 A. W. BATEMAN 2,801,949
PROCESS OF MAKING PATENT LEATHER-LIKE FINISH
ON POLYVINYL CHLORIDE SHEET MATERIALS
Filed Nov. 6, 1953 2 Sheets-Sheet 2
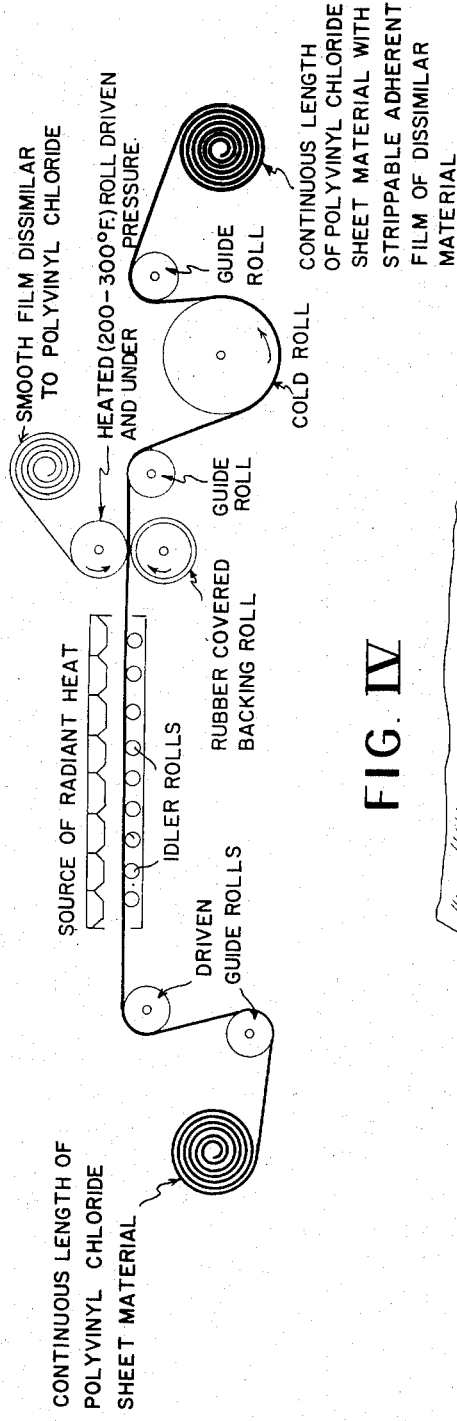
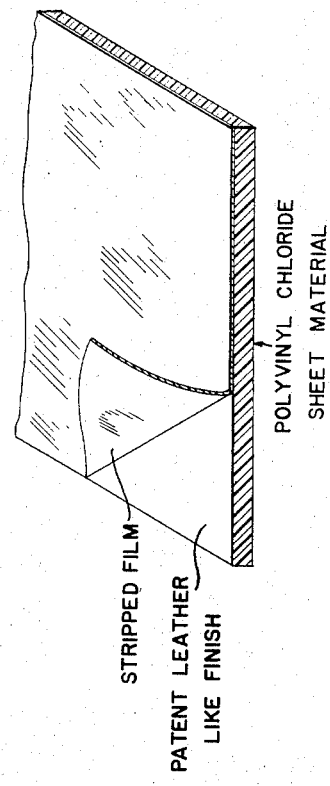
INVENTOR
ALVA WAYNE BATEMAN
BY
AGENT

United States Patent Office

2,801,949
Patented Aug. 6, 1957

2,801,949

PROCESS OF MAKING PATENT LEATHER-LIKE FINISH ON POLYVINYL CHLORIDE SHEET MATERIALS

Alva Wayne Bateman, Newburgh, N. Y., assignor to E. I. du Pont de Nemours and Company, Wilmington, Del., a corporation of Delaware Application November 6, 1953, Serial No. 390,481

2 Claims. (Cl. 154—120)

This invention relates to laminated assemblies and more particularly to a process of producing patent leather-like finish on polyvinyl chloride sheet materials.

This application is a continuation-in-part of my earlier application S. N. 357,613, filed May 26, 1953, now abandoned.

Simulated patent leather finish on plastic sheet materials have been made heretofore by press-polishing technique. This procedure involves cutting the plastic sheet material into pieces the size of the platen in the press, usually about 24" x 48". A plurality of the plastic sheets, with metal plates highly polished on one side sandwiched between the plastic sheets, is subjected to a hydraulic pressure and sufficient heat to soften the plastic sheets and mold them to the highly polished surface of the metal plates. The alternating layers of the plastic sheets and highly polished metal plates are kept under pressure at an elevated temperature for several minutes and then cooled to room temperature while under pressure for several additional minutes before removing from the press.

The press-polishing process produces an entirely satisfactory patent leather-like finish on the plastic sheet material, however, there are several inherent disadvantages to such a process. First, and the most serious shortcoming, is that it is a batch process and cannot be applied to continuous lengths of plastic sheet material. Further, when the process is applied to polyvinyl chloride coated fabrics the fabric pattern is visible on the surface of the mirror-like finish. Still further, sheets of the patent leather finish must be protected during shipment, which usually involves interleaving between each polished sheet, smooth paper or cellulosic film. The interleaving of paper or film present a problem in that it is practically impossible to get complete contact between the mirror-like surface and the interleaving material. There are innumerable air pockets between the interleaving material and the highly polished plastic surface which produce a mottled effect when the sheets are separated. When cellulosic film is used as the interleaving material it wrinkles and mars the highly polished plastic surface.

It has also been proposed to apply a mirror-like finish to continuous lengths of polyvinyl chloride film by passing it between two heated pressure rolls while mounted on a highly polished metal belt. Once the mirror-like finish is formed on the polyvinyl chloride film it is subject to the same problems encountered with the press polishing methods, i. e., damage during shipping. If the continuous lengths are wound in rolls with a smooth sheet of paper or cellulosic film interwound to protect the finish during shipping, there is considerable damage to the finish due to wrinkling and air pockets between the mirror-like finish and the interwound material. The damage to the patent leather-like finish when in roll form, with the interwound protective material, is greater than when packaged as flat sheets with the interleaving film or paper and consequently the highly polished sheet material produced in continuous lengths is often cut into pieces for packaging and shipment, thus nullifying the primary advantage of the continuous process.

A primary object of this invention is the production of a patent leather-like finish on a polyvinyl chloride surface. A further object of this invention is the production of polyvinyl chloride sheet materials with a mirror-like finish which can be batched up in roll form and shipped or stored without encountering damage to the highly polished finish due to the transfer of the patterns from the back of the material onto the highly polished finish. A still further object is the provision of a continuous method for producing a highly polished mirror-like finish on continuous lengths of polyvinyl chloride unsupported films and coated fabrics which is economical and does not require complicated high pressure equipment. These and other important objects become readily apparent as the description of the invention proceeds.

The objects of this invention are accomplished by intimately laminating a polyvinyl chloride sheet material to a film of material dissimilar to polyvinyl chloride by passing the two between pressure rolls in such a manner that there are no air spaces between the polyvinyl chloride surface and the dissimilar film. Heat is applied to the polyvinyl chloride surface by one of the pressure rolls or the heat may be applied to the polyvinyl chloride surface immediately prior to the laminating step. The degree of adhesion or bond between the polyvinyl chloride surface and dissimilar film must be great enough to permit the laminated material to be rolled on a three inch diameter core, without encountering any separation between the two laminae. The degree of adhesion must be low enough to permit the dissimilar film to be stripped from the polyvinyl chloride surface without marring the surface finish. The polyvinyl chloride surface is molded against the dissimilar film and when the two are separated the polyvinyl chloride surface is as smooth as the dissimilar film and has a mirror-like finish.

In the accompanying drawing Figure I is a diagrammatic side view of an arrangement for carrying out the invention in which a smooth preformed length of film, dissimilar to polyvinyl chloride, is passed around guide rolls to a heated backing roll where a rubber covered squeegee roll presses it against the polyvinyl chloride surface to adhere it thereto and the assembly is wound up in roll form.

Figure II is a diagrammatic side view of an arrangement for applying a top coat to a continuous length of polyvinyl chloride sheet material, heating the sheet material to dry the top coat, laminating a continuous length of smooth film of dissimilar material to the polyvinyl chloride surface while it is at an elevated temperature, and winding the assembly up in roll form.

Figure III is a diagrammatic side view of an assembly for laminating a continuous length of smooth film of material dissimilar to polyvinyl chloride to a continuous length of polyvinyl chloride sheet material which is heated just prior to contacting the dissimilar film.

Figure IV is a perspective view of the polyvinyl chloride sheet material with adherent film of dissimilar material partially stripped from the polyvinyl chloride surface.

*Example I*

A high gloss, mirror-like finish was produced on a polyvinyl chloride coated fabric by the following process:

A cotton sheeting fabric running 2.40 yards per pound per 60 inch width, thread count 56 x 60, was diastased, washed and dyed black. The fabric was doctor knife coated on one side with 1 coat of the following composition:

| Base coating composition: | Percent by wt. |
|---|---|
| Polyvinyl chloride | 12.0 |
| Dioctyl phthalate | 8.0 |
| Methyl ethyl ketone | 80.0 |
| | 100.0 |

Sufficient of the above composition was applied to deposit about ½ ounce per square yard of non-volatile components. It was passed through a heat zone to expel the methyl ethyl ketone. The coated fabric was calendered by passing between heated pressure rolls to smooth the coating. The coated and calendered fabric was further coated with the following plastisol composition:

| Plastisol coating composition: | Percent by wt. |
|---|---|
| Polyvinyl chloride | 48.0 |
| Dioctyl phthalate | 32.0 |
| Bone black | 10.0 |
| Barytes | 10.0 |

The plastisol composition is prepared by grinding the pigment and filler in the dioctyl phthalate then stirring polyvinyl chloride powder in the pigment/plasticizer mixture at room temperature so as not to colloid the polyvinyl chloride. Sufficient of the plastisol composition is applied to deposit a coating of about 12.0 ounces per square yard. The coated fabric is next passed through a heat zone to heat the plastisol coating up to 300–375° F., at which temperature the polyvinyl chloride is colloided in the dioctyl phthalate and upon cooling a strong tough film results.

The thus described coated fabric was divided into five parts and each part coated with one of the following top coats:

| Top coat No. 1: | Percent by wt. |
|---|---|
| Polyvinyl chloride | 10.0 |
| Methyl ethyl ketone | 90.0 |
| | 100.0 |

| Top coat No. 2: | Percent by wt. |
|---|---|
| Polyvinyl chloride | 8.8 |
| Polymethyl methacrylate | 2.9 |
| Methyl ethyl ketone | 88.3 |
| | 100.0 |

| Top coat No. 3: | Percent by wt. |
|---|---|
| Polyvinyl chloride | 8.3 |
| Polymethyl methacrylate | 2.7 |
| Polypropylene adipate | 5.9 |
| Methyl ethyl ketone | 83.1 |
| | 100.0 |

| Top coat No. 4: | Percent by wt. |
|---|---|
| Copolymer of 90 parts vinyl chloride and 10 parts vinyl acetate (by weight) | 13.1 |
| Polymethyl methacrylate | 4.4 |
| Polypropylene adipate | 13.2 |
| Methyl ethyl ketone | 69.3 |
| | 100.0 |

| Top coat No. 5: | Percent by wt. |
|---|---|
| Copolymer of 90 parts vinyl chloride and 10 parts vinyl acetate (by weight) | 15.2 |
| Polymethyl methacrylate | 5.0 |
| Methyl ethyl ketone | 79.8 |
| | 100.0 |

Sufficient top coat composition was applied in each case to deposit approximately .5 ounce per square yard of non-volatile components. At this stage the pattern of the base fabric showed through the coating in each of the five separate lengths of the coated fabric.

The surfaces of the polyvinyl chloride coated fabrics, with the five different top coats, were laminated to a smooth ½ mil thick polyethylene terephthalate film by means of an apparatus illustrated in Figure I of the drawing. During the laminating step the coated side of the polyvinyl chloride coating was brought in contact with the ½ mil thick polyethylene terephthalate film by passing between two rolls under slight pressure. One of the rolls was about 2 feet in diameter and had a smooth polished metal surface heated to about 265° F. The other roll was an unheated rubber covered roll about 10 inches in diameter. The ½ mil polyethylene terephthalate film was unwound from a supply roll, then passed around guide rolls in such a manner that it contacted the heated roll for about ⅛ of its circumference before it passed between the nip of the two rolls under pressure where contact was made with the polyvinyl chloride coating. The polyvinyl chloride coated fabric was unwound from a supply roll in such a manner that it contacted about ½ of the circumference of the rubber cover roll, which acted as a squeegee roll. It is important that the smooth film be free of wrinkling or buckling where it contacts the polyvinyl chloride coating in the nip of the two rollers. The larger of the two rolls was heated to about 265° F., which amount of heat is beneficial in smoothing wrinkles from the polyethylene terephthalate film while in contact with it prior to contacting the polyvinyl chloride coating. The coated fabric and polyethylene terephthalate film were brought together in such a manner that there were no air pockets formed between them. The polyethylene terephthalate film was adhered to the coated surface of the polyvinyl chloride coating. The degree of adhesion was sufficient that the laminated product could be wound on a three inch diameter tube with the polyethylene terephthalate film on either the outside or inside of the convolutions, without the two films becoming detached in spots as a result of the difference in circumference between the outside and inside of each convolution of the laminated assembly. The bond strength between the two films was low enough to permit them to be separated without distorting or marring the highly polished finish formed on the polyvinyl chloride coating.

The laminated assembly is an article of commerce which can be stored and/or shipped in roll form to converters who strip the polyethylene terephthalate film from the polyvinyl chloride film just prior to or after converting it into consumer products, such as, e. g. ladies' pocketbooks, shoes, cap bills, millinery, and novelties.

The polyvinyl chloride coating was molded against the smooth polyethylene terephthalate film and formed a smooth patent leather-like finish on the polyvinyl chloride coating. The finish obtained equalled that obtained by placing the coated side of the coated fabric in contact with a highly polished metal plate and subjecting the two to a pressure of 175 pounds per square inch and a temperature of 160° C. for several minutes and cooling the assembly before releasing the pressure. There was less fabric pattern visible on the patent leather-like finish made by the lamination technique followed by stripping than the press-polished coated fabric.

*Example II*

A patent leather-like finish was formed on a coated fabric in accordance with the following procedure:

A combed lawn cotton sheeting fabric running 6.75 yards per pound per 40 inch width, thread count 96 x 100, was diastased, washed and dyed black. The dyed fabric was coated with two coats of the following base coating composition:

Base coating composition: Percent by wt.
  Polyvinyl chloride_____ 12.0
  Dioctyl phthalate_____ 8.0
  Methyl ethyl ketone_____ 80.0
                                           ―――
                                           100.0

After each coat the material was passed through a heat zone to evaporate the volatile solvent. Sufficient base coating composition was applied to deposit approximately one ounce per square yard of non-volatile components. The coated fabric was next passed between heated calender rolls to smooth the coating. The calendered base coated fabric was next doctor knife coated with one coat of the following plastisol composition:

Plastisol coating composition: Percent by wt.
  Polyvinyl chloride_____ 49.8
  Dioctyl phthalate_____ 30.2
  Bone black_____ 3.5
  Barytes _____ 16.5
                                           ―――
                                           100.0

The plastisol composition was prepared as described above. Approximately 12.0 ounces per square yard of the plastisol composition was spread on the base coated fabric in one coat. The coated fabric was then passed through a heat zone where the coating was heated to about 350° F. at which temperature the resin was colloided in the plasticizer. Upon cooling to room temperature a tough high strength coating was formed on the fabric. The coated fabric was then top coated with the following composition:

Top coat composition: Percent by wt.
  Copolymer of 88 parts vinyl chloride and 12
    parts vinylidene chloride (by weight)_____ 13.1
  Polymethyl methacrylate_____ 4.4
  Methyl ethyl ketone_____ 82.5
                                             ―――
                                             100.0

Sufficient top coat composition was applied by means of a doctor knife to deposit approximately .5 ounce per square yard non-volatile components, after which the material was passed through a heat zone to evaporate the methyl ethyl ketone. The coated fabric was batched up in the form of a roll after the drying operation and when unwound the pattern of the base fabric showed through the coating. The coated fabric was laminated to plain transparent cellulosic film free of surface coatings, known as PT cellophane, weighing 1.7 ounces per square yard in the same manner as described in Example I. The degree of adhesion of the cellulosic film was such that there was no delamination when the assembly was rolled on a three inch core, with the cellulosic film on either the inside or outside of each convolution. The strength of the bond between the cellulosic film and the polyvinyl chloride coating was weak enough to permit the cellulosic film to be stripped therefrom.

When the cellulosic film was stripped from the coated fabric a smooth patent leather-like finish free from plastic pattern was visible on the coated fabric. The laminated assembly was batched up in 60 yard rolls 38 inches wide, weighing approximately 60 pounds each and shipped in paper cartons with 4 rolls per carton. After storage and shipment the cellulosic film was stripped from the coated fabric and there was no fabric pattern visible on the surface of the coating.

*Example III*

A portion of coated fabric described in Example II, without the clear top coat, was laminated to PT cellophane weighing 1.7 ounces per square yard by means of the apparatus illustrated in the drawing as Figure III. In this example the polyvinyl chloride coated fabric was passed under Chromalox radiant heaters to soften the polyvinyl chloride coating. As the heated coated fabric emerged from the heat zone the cellophane was rolled on to the softened coating by passing the two laminae between a smooth metal roll and a rubber covered backing roll under slight pressure. The film is rolled on to the softened polyvinyl chloride coating in such a manner that there are no air spaces between the two laminae. The degree of adhesion of the two laminae was sufficiently great to permit the laminated assembly to be passed around guide rolls, cooling drum and batching in roll form on a 3 inch core without any delamination. The coated fabric was wound up in rolls of 60–100 yards and stored for several weeks. Subsequently the cellophane was stripped from the polyvinyl chloride coated fabric. A smooth mirror-like finish was formed on the polyvinyl chloride coating free of fabric pattern.

*Example IV*

A high gloss patent leather-like finish was formed on a continuous length of an unsupported polyvinyl chloride film by the following process:

An unsupported 20 mil film of polyvinyl chloride was formed by calendering the following composition:

Parts by wt.
Copolymer of 95 parts vinyl chloride and 5 parts
  vinyl acetate (by weight)_____ 100.0
Carbon black_____ 4.5
Calcium carbonate_____ 58.0
Polypropylene adipate_____ 1.0
Dioctyl phthalate_____ 43.5
Hydrogenated terphenyl_____ 12.0
Stabilizer—Lead silicate_____ 4.0
Calcium stearate_____ .7
Carnauba wax_____ .7
                                                ―――
                                                224.4

The unsupported calendered film was coated on one side by means of a doctor knife, with approximately two ounces per square yard of the following composition:

Parts by wt.
Copolymer of 90 parts vinyl chloride and 10 parts
  vinyl acetate (by weight)_____ 14.1
Polymethyl methacrylate_____ 4.7
Polypropylene adipate_____ 7.1
Methyl ethyl ketone_____ 74.1
                                               ―――
                                               100.0

The volatile solvent was evaporated by passing the coated film through a heat zone. The dry coated film was cooled to room temperature and wound up in roll form. The coated film at this stage had a bright finish but it showed surface irregularities resulting from the unevenness of the coating edge of the doctor knife as well as surface irregularities formed during the calendering operation. The back, i. e., uncoated side of the film had more surface irregularities than the face, i. e., coated side.

The coated surface of the polyvinyl chloride film was laminated to a ½ mil thick polyethylene terephthalate film by means of an apparatus illustrated in Figure I of the drawing. During the laminating step the coated side of the polyvinyl chloride film was brought in contact with the ½ mil thick polyethylene terephthalate film by passing between two rolls under slight pressure. One of the rolls was of smooth polished metal about 2 feet in diameter and was heated to about 265° F. The other roll was an unheated rubber covered roll about 10 inches in diameter. The ½ mil polyethylene terephthalate film was unwound from a supply roll, then passed under and over guide rolls in such a manner that it contacted the heated roll for about ⅛ of its circumference before it passed between the nip of the two rolls where contact was made with the coated surface of the polyvinyl chloride film. The polyvinyl chloride film was unwound from a supply roll in such a manner that it contacted about ½ of the circumference of the rubber covered roll, which acted as a squeegee roll. It is important that the two films be free of wrinkling or buckling where the two meet in the nip of the two rollers. The larger of the two rolls was heated to about 265° F., which amount of heat is beneficial in smoothing wrinkles from the polyethylene terephthalate film while in contact with it prior to contacting the polyvinyl chloride film. The two films were brought in contact in such a manner that there were no air pockets formed between them. The polyethylene terephthalate film was adhered to the coated surface of the polyvinyl chloride film. The degree of adhesion was sufficient that the laminated product could be wound on a one inch diameter tube with polyethylene terephthalate film either on the outside or inside of the convolutions, without the two films becoming detached in spots as a result of the difference in circumference between the outside and inside of each convolution of the laminated assembly. The bond strength between the two films was low enough to permit them to be separated without distorting or marring the finish on the polyvinyl chloride film.

The laminated assembly is an article of commerce which can be shipped in roll form to converters who can strip the polyethylene terephthalate film from the polyvinyl chloride film just prior to or after converting it into consumer products, such as, e. g., ladies' pocketbooks, shoes, cap bills, and novelties.

During the time the two films were in intimate contact the coated surface of the polyvinyl chloride film was molded against the smooth polyethylene terephthalate film and a smooth patent leather-like finish was formed on the polyvinyl chloride surface. The finish obtained equalled that obtained by placing the polyvinyl chloride film in contact with a highly polished metal plate and subjecting the two to a pressure of 175 pounds per square inch and a temperature of 160° C. for several minutes and cooling the assembly before releasing the pressure.

Comparable results were obtained when cellophane (regenerated cellulose film) weighing 1.7 ounces per square yard and cellulose acetate film (1 mil thick) were substituted for the polyethylene terephthalate film in the above example.

A commercially acceptable patent leather-like finish was also produced on unsupported polyvinyl chloride film in the same manner as described in Example IV except that the dissimilar film was laminated directly on the calendered surface of the polyvinyl chloride film without the application of top coats.

It was surprising and unexpected that a short interval of pressure contact of dissimilar film with the surface of the polyvinyl chloride would produce a patent leather-like finish, particularly in view of the prolonged pressure and high temperatures required in the press polishing of the polyvinyl chloride sheet material. Highly polished metal rolls as the molding surface do not produce the same high lustre as the dissimilar film.

Alternately the top coat and the clear film may be applied to the polyvinyl chloride unsupported film or coated fabric by means of the apparatus illustrated in Figure II, in which the dissimilar film is laminated to the top coated material immediately after the solvent has been evaporated and while the polyvinyl chloride is at an elevated temperature. The material is then wound around a cooling drum before batching up in roll form.

Unusual surface effects can be obtained by embossing the laminated assembly before the dissimilar film is stripped from the polyvinyl chloride surface. Normally polyvinyl chloride sheets cannot be embossed with high pressures and temperatures since the coating sticks to the heated embossing roll. The dissimilar film prevents such sticking. It is also possible to obtain unusual surface effects by using an engraved roll to press the dissimilar film onto the polyvinyl chloride coating.

The drawing illustrates certain of the preferred embodiments in which the patent leather-like finish is formed on polyvinyl chloride sheet materials unwound from rolls. It is also within the scope of this invention to form the patent leather-like finish on short pieces of polyvinyl chloride sheet materials by means of an apparatus as illustrated in Figure I in which the short pieces of polyvinyl chloride sheet material are fed to the pressure rolls by hand.

In place of polyvinyl chloride it will be readily apparent that copolymers of vinyl chloride and other monomers copolymerizable therewith, such as, e. g. vinyl acetate, vinylidene chloride, diethyl and dimethyl fumarates, esters of acrylic acid and esters of methacrylic acid, may be used in practicing this invention. In the case of copolymers, the major component is vinyl chloride and preferably not less than about 80% vinyl chloride.

In the claims the term "polyvinyl chloride" is used to denote compositions in which the film forming component is polyvinyl chloride and/or copolymers of vinyl chloride blended with other compounding ingredients such as, plasticizers, pigments, fillers and stabilizers. Also by the term "intimately adhered" is meant a degree of adhesion in which there are no air spaces between the polyvinyl chloride surface and the dissimilar film and the degree of adhesion is great enough to permit the laminated material to be rolled on a three inch diameter core without encountering any separation between the two laminae and low enough to permit the dissimilar film to be stripped from the polyvinyl chloride surface without marring the patent leather-like finish on the polyvinyl chloride surface.

The dissimilar film against which the polyvinyl chloride composition is molded must be smooth and incompatible with and innocuous to the polyvinyl chloride, as well as the plasticizers in the polyvinyl chloride coating, in order that there will be no migration from the polyvinyl chloride composition to the film against which it is molded or vice versa.

In place of the woven cotton fabric referred to in the specific examples, woven and non-woven fabrics made from other natural fibers and/or synthetic fibers, including papers and felts, may be used. The non-woven fabrics described in copending applications S. N. 232,245, filed June 18, 1951, now U. S. Patent 2,676,128; and S. N. 267,911, filed January 23, 1952, now abandoned; are particularly suited as a base material for the polyvinyl chloride coatings in carrying out this invention. The patent leather-like finish may also be applied to polyvinyl chloride coated leather in accordance with this invention, in which case the coated side of the leather, in contact with the dissimilar film, is passed between the pressure rolls.

It is apparent that many widely different embodiments of this invention may be made without departing from the spirit and scope thereof and, therefore, it is not intended to be limited except as indicated in the appended claims.

I claim:

1. The process of producing a continuous length of flexible pigmented polyvinyl chloride sheet material in roll form, with a smooth, highly polished, mirror-like finish that will be preserved during storage and shipping, which comprises adhering to the normally exposed surface of a preformed polyvinyl chloride sheet material a smooth strippable film of material being a member of the class consisting of cellophane, polyethylene terephthalate and cellulose acetate, by passing said sheet material and film between revolving pressure rolls with the film in contact with said normally exposed surface, at least one of said pressure rolls being heated, whereby the surface of said sheet material is molded against said smooth film, rolling up the laminated assembly, storing the roll and stripping said film from the polyvinyl chloride surface prior to use.

2. The process of producing a continuous length of flexible pigmented polyvinyl chloride sheet material in roll form, with a smooth, highly polished, mirror-like finish that will be preserved during storage and shipping, which comprises adhering to the normally exposed surface of a preformed polyvinyl chloride sheet material a smooth strippable film of material being a member of the class consisting of cellophane, polyethylene terephthalate and cellulose acetate, by passing said sheet material and film between revolving pressure rolls with the film in contact with said normally exposed surface, heating the polyvinyl chloride sheet material immediately prior to passing between the pressure rolls, whereby the surface of said sheet material is molded against said smooth film, rolling up the laminated assembly, storing the roll and stripping the said film from the polyvinyl chloride surface prior to use.

References Cited in the file of this patent

UNITED STATES PATENTS

| | | |
|---|---|---|
| 2,275,957 | Groff | Mar. 10, 1942 |
| 2,303,826 | De Bell | Dec. 1, 1942 |
| 2,303,828 | Derby | Dec. 1, 1942 |
| 2,626,886 | Scholl | Jan. 27, 1953 |
| 2,653,885 | Harper | Sept. 29, 1953 |
| 2,656,292 | Hoover | Oct. 20, 1953 |